United States Patent [19]

Stelzer

[11] 3,841,711
[45] Oct. 15, 1974

[54] DUAL BRAKE SYSTEM HAVING BYPASS VALVE

[75] Inventor: William Stelzer, Milford, Mich.

[73] Assignee: Kelsey-Hayes Company, Romulus, Mich.

[22] Filed: Nov. 29, 1968

[21] Appl. No.: 780,029

Related U.S. Application Data

[63] Continuation-in-part of Ser. No. 661,415, Aug. 17, 1967, abandoned.

[52] U.S. Cl.............. 303/6 C, 188/349, 303/84 A
[51] Int. Cl............................................. B60t 11/34
[58] Field of Search............ 303/84, 84 A, 6 C, 6 R, 303/84 R; 200/82, 82.31; 340/52 C; 92/51; 188/151.11, 152.11, 349, 151 A; 137/87, 98–101; 60/54.5 E; 116/70

[56] References Cited
UNITED STATES PATENTS

| | | | |
|---|---|---|---|
| 1,993,790 | 3/1935 | Kinsella | 303/84 A UX |
| 2,195,214 | 3/1940 | Jacob | 303/84 |
| 2,991,797 | 7/1961 | Baldwin | 137/493 |
| 3,169,800 | 2/1965 | Uberthur | 303/22 R |
| 3,315,469 | 4/1967 | Stelzer | 303/6 |
| 3,358,097 | 7/1966 | Kersting | 200/82 |
| 3,368,350 | 2/1968 | Cripe | 60/54.5 E |
| 3,448,230 | 6/1969 | Bjeler | 303/6 C X |

Primary Examiner—Duane A. Reger
Assistant Examiner—D. C. Butler
Attorney, Agent, or Firm—Harness, Dickey & Pierce

[57] ABSTRACT

A dual hydraulic brake system of the type incorporating a dual master cylinder for separately pressurizing the front and rear brakes of a vehicle and one or more pressure modulating devices in the rear system. Both a pressure proportioning valve and an electronically controlled antiskid valve are incorporated in the rear system. A bypass valve is arranged to bypass both the proportioning and antiskid valves in the event of a loss of pressure in the front brake system, thereby permitting the delivery of maximum braking pressure to the rear brakes under such conditions.

35 Claims, 4 Drawing Figures

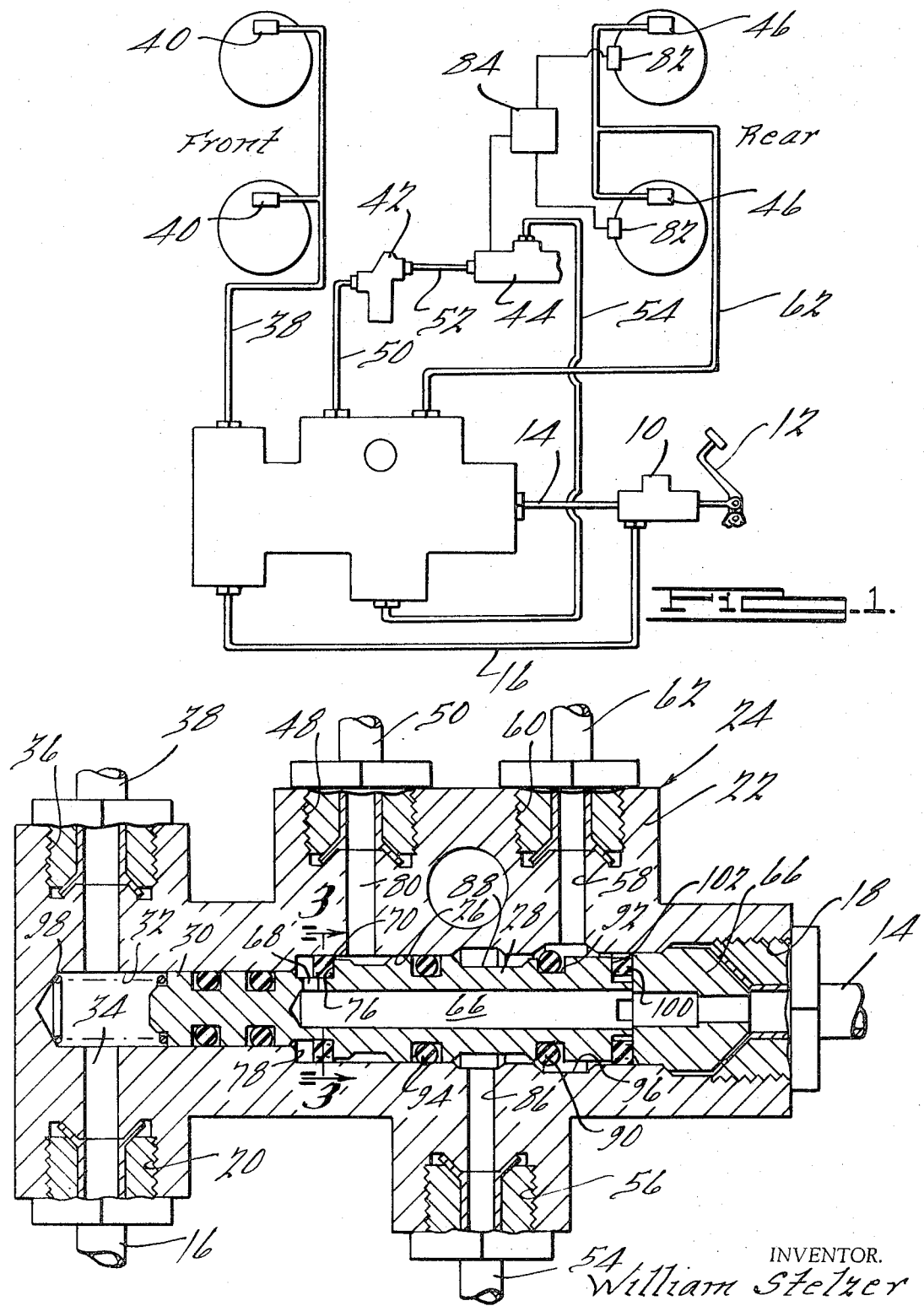

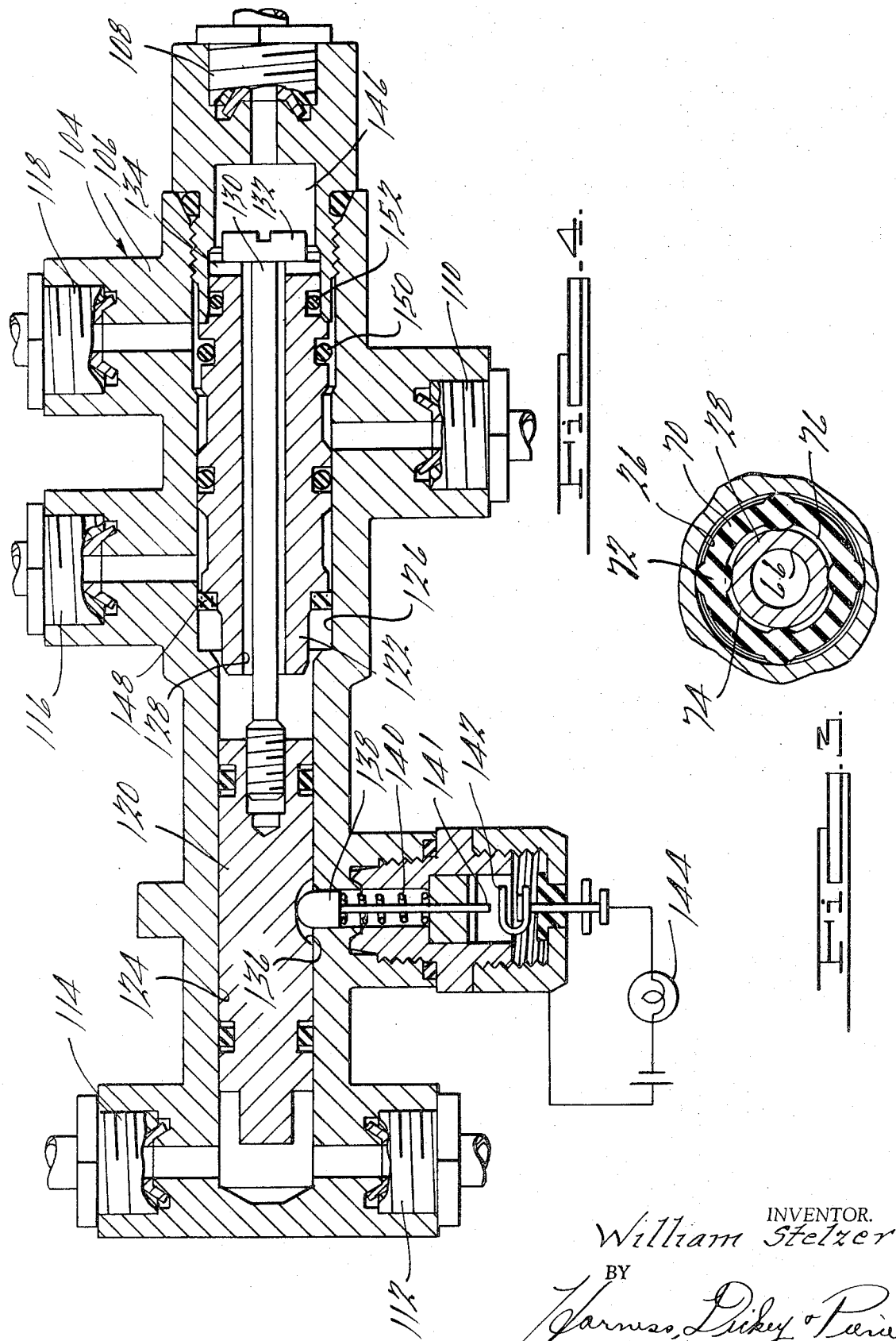

DUAL BRAKE SYSTEM HAVING BYPASS VALVE

RELATED APPLICATIONS

This application is continuation-in-part of United States Letters Patent application, Ser. No. 661,415, Filed Aug. 17, 1967 now abandoned by William T. Birge et al for Dual Brake System with Pressure Failure Warning Device.

SUMMARY OF THE INVENTION

Various pressure modulating devices have been proposed for vehicle brake systems to prevent or minimize skidding. In many systems, sensors are positioned at one or more of the wheels to determine when such wheels are decelerating at an excessively high rate of speed. Such sensors may be connected to an electronic control unit which regulates the operation of a pressure relieving valve. An example of such a pressure relieving valve is found in U.S. Pat. No. 3,223,459 of Dec. 14, 1965, in which a pneumatically operated plunger moves to expand the volume of a chamber in which the brake fluid is confined. Such a pressure relieving valve may be utilized in in a dual braking system to reduce the pressure of the brake fluid in one of the systems, e.g., the rear brake system. In a dual system, however, I believe that it is highly desirable to dispense with all pressure reducing functions and deliver maximum pressure to the rear wheel brakes if a loss of pressure in the front brake system is experienced. It makes no difference that the rear wheels skid inasmuch as the rear wheels will not tend to overrun the front wheels and cause loss of control of the vehicle if the front wheels are not being braked.

When the pressure modulating device which is utilized in a dual brake system consists only of a pressure proportioning valve, the bypass arrangement for such a valve may be relatively simple. On the other hand, if the pressure modulating device incorporates an expansible chamber, the bypass arrangement must be somewhat more complicated. Under such circumstances the pressure modulating device must be completely isolated from the master cylinder and the brake cylinders and a wholly new passage for transmission of pressure to the rear brakes must be used. A bypass valve for accomplishing this function is disclosed herein. This bypass valve also provides multiple fittings for connection to the brake cylinders thereby eliminating separate "T" connectors. The bypass valve may also be made to incorporate a warning device, producing a visible or audible signal that the bypass has opened and the pressure failed.

The brake system disclosed herein utilizes a bypass valve which is connected between the master cylinder and a pressure modulating valve and between the pressure modulating valve and the rear brake cylinders. In addition, the bypass valve is connected between the master cylinder and the front brake cylinders. The bypass valve incorporates a piston which is exposed to the front and rear brake pressures on opposite sides thereof so that upon failure of the pressure in one of the systems the piston will be moved by the pressure of the other system. This piston has associated with it a plurality of seals or valve elements so that upon the movement of the piston such seals or valve elements will block the flow of fluid from either the master cylinder or rear brakes to the pressure modulating device and open a previously closed passage leading from the master cylinder directly to the rear brake cylinders.

DESCRIPTION OF THE VIEWS OF THE DRAWINGS

FIG. 1 is a schematic view of a brake system embodying the principles of the present invention;

FIG. 2 is a sectional view of the bypass valve forming a part of the brake system illustrated in FIG. 1;

FIG. 3 is an enlarged sectional view of the structure illustrated in FIG. 2, taken along the line 3—3 thereof; and FIG. 4 is a sectional view of a bypass valve similarly illustrated in FIG. 2, showing another form of the present invention.

DESCRIPTION OF THE ILLUSTRATED EMBODIMENTS OF THE INVENTION

The brake system shown in FIG. 1 employs a conventional dual master cylinder 10 operated by a brake pedal 12. The dual master cylinder 10 is connected to a first brake line 14 which forms a part of the rear brake system and a brake line 16 forming a part of the front brake system. The brake lines 14 and 16 are connected to inlet openings 18 and 20, respectively, of a metal housing 22 of a bypass valve 24. The housing 22 is formed with a bore 26 in which a valve spool 28 is shiftable. The valve spool 28 has an integral reduced diameter piston portion 30 which is slidable in a reduced diameter bore 32 coaxial with and open to the bore 26 at the left hand end thereof. The reduced diameter bore portion 32 is formed at the left-hand end of the bore 26 and is open to a passage 34 extending from the inlet opening 20 to an outlet opening 36. The outlet opening 36 is connected to a brake line 38 which is, in turn, connected to the front wheel brake cylinders 40.

The rear braking system includes two brake pressure modulating devices in the form of a pressure proportioning valve 42 and a pressure relieving valve 44 through which pressure is normally transmitted to rear wheel brake cylinders 46. Fluid normally flows from the housing 22 through an outlet opening 48 and through a brake line 50 to the proportioning valve 42. The proportioning valve 42 is connected through a brake line 52 to the pressure modulating valve 44 which, in turn, is connected by a brake line 54 to an inlet opening 56 of the housing 22. Fluid flows from the inlet opening 56 through the bore 26 to a passage 58 connected to an outlet opening 60. The opening 60 is connected to a brake line 62 which communicates with the rear wheel brake cylinders 46.

Pressure is transmitted from the master cylinder 10 to the rear brake cylinders 46 through the foregoing path so long as the front brakes are also being pressurized. Brake fluid entering the housing 22 through the inlet opening 18 passes through a centrally apertured fitting 64 and thence down an elongated passage 66 extending longitudinally in the valve spool 28. The right-hand end of the passage 66 is open to the right-hand end of the valve spool 28, while the left-hand end of the passage 66 communicates through a port 68 to the outer periphery of the valve spool at the left-hand end of the bore 26. Fluid flows from the left-hand end of the bore 26, past the outer periphery of a valve element or seal 70 in the form of an annular ring. The seal 70 is illustrated in greater detail in FIG. 3 and will be seen to have a plurality of circumferentially spaced bosses 72. The bosses 72 project both radially outwardly and radially inwardly from the portions of the seal 70 therebetween, and they engage the inner wall of a groove 74 of the valve spool 28 as well as the wall of the bore 26. The groove 74 is defined on one side by a shoulder 76 which abuts one side of the seal 70. The opposite side of the seal 70 is engageable with an annular shoulder 78 formed in the housing 22 between the bore 26 and the bore 32. It will be apparent that the fluid flowing from the port 68 is free to flow between the bosses 72, past the seal 70, to a passage 80 communicating with the outlet opening 48.

The proportioning valve 42 may be of the type shown in my prior application Ser. No. 532,471, filed Mar. 7, 1966. The purpose of the valve 42 is to reduce the level of pressure in the brake line 52 relative to the pressure in brake line 50 at the higher ranges of applied brake pressure. This is desirable inasmuch as higher brake pressures produce relatively rapid deceleration of the vehicle which is accompanied by a transfer of weight from the rear wheels to the front wheels of the vehicle. When this occurs the percentage of the braking effort which can be handled by the rear wheels without skidding is reduced and the ratio of rear wheel cylinder brake pressure to front wheel cylinder brake pressure is desirable reduced to prevent premature rear wheel skid. In the event that incipient rear wheel skid is experienced, however, this will be detected by sensors 82 and an electrical signal delivered to a control module 84. The control module 84 controls the operation of electrical valves (not shown) embodied within the pressure relieving valve 44 to produce expansion of a brake fluid chamber contained therewithin as illustrated in the aforesaid U.S. Pat. No. 3,223,459. Accordingly, the valve 44 is operable to relieve the pressure of brake fluid within the brake line 54 which is normally in communication with the rear brake cylinders 46 through a passage 86 communicating with the inlet opening 56. The passage 86 confronts a peripheral groove 88 formed on the valve spool 28 and fluid will flow around the groove 88 past an O-ring 90 to the passage 58 and thence to the outlet opening 60. The O-ring 90 is carried within a groove 92 of the valve spool 28. Fluid within the groove 88 is sealed from the passage 80 and outlet 48 by an O-ring 94 carried on the periphery of the valve spool 28 and engageable with the wall of the bore 26 between the groove 88 and the passage 80. The O-ring 94 remains in engagement with the wall of the bore 26 at all times. On the other hand, the O-ring 90 is surrounded by a groove 96 formed in the wall of the bore 26 to provide a space around the O-ring 90 for the flow of fluid from the passage 86 to the passage 58.

From the foregoing it will be apparent that the piston portion 30 is exposed to the pressure of front brake fluid pressure acting on the left-hand end thereof and rear brake fluid pressure acting on the right-hand end thereof. These pressures create opposing forces on the piston portion 30, but the valve spool 28 and its piston portion 30 are normally held in the position shown in FIG. 2 by a light weight spring 98 acting against the left-hand end of the piston portion 30. Assuming that front brake pressure is at least as great as rear brake pressure, the valve spool 28 will remain in its right-hand position as illustrated, due to the force of the spring 98. If the front brakes fail, however, the pressure in the rear brake system will overcome the spring 98 and shift the valve spool 28 and its piston portion 30 to the left. When this happens the left-hand side of the seal 70 will be brought into engagement with the shoulder 78, blocking communication between the passages 58 and 80. At the same time a seal or valve element 100 will be opened.

The seal 100 is identical in configuration to the seal 70 and normally seals between the left-hand side of the fitting 64 and an annular shoulder 102 formed adjacent the right-hand end of the valve spool 28. When the valve spool 28 moves to the left, fluid can flow around the seal 100 directly from the inlet opening 18 to the passage 58. At the same time the O-ring 90 will engage the wall of the bore 26 at one side of the groove 96 to block fluid communication between the passage 86 and the passage 58. By this means the proportioning valve 42 and pressure relieving valve 44 are entirely isolated from the rear brake system and the functioning of either the pressure proportioning valve 42 or pressure relieving valve 44 will have no effect on the pressure of the brake fluid delivered to the rear brake cylinders 46. This is desirable when the front brakes fail as maximum pressurization of the rear brake cylinders 46 is desired under such circumstances.

FIG. 4 illustrates a somewhat modified form of a bypass valve 104 including a housing 106 having inlet openings 108, 110, 112, 114, 116 and 118, which are connected in the system in a manner similar to the openings 18, 56, 20, 36, 48 and 60, respectively, of the valve 24. The valve 104 differs from the valve 24 in that a piston 120 is provided which is separate from but associated with a valve spool 122. The piston 120 slides in a bore 124, while the valve spool 122 slides within a bore 126 which is concentric with and in communication with the bore 124. The valve spool 122 has an opening 128 extending longitudinally therethrough and through which a screw 130 passes. The screw 130 has a head 132 abuttable with the righthand end of the valve spool 122 and is threaded into the right-hand end of the piston 120. The right-hand end of the valve spool 122 is slotted, as indicated at 134 for the flow of fluid around the screw head 132 and down the length of the opening 128 around the shank of the screw 130.

The piston 120 is provided with a cam recess 136 formed on its side in which a button 138 is received. The button 138 is biased against the wall of the recess 136 by a coil spring 140 and is connected to a contact 141 which is engageable with a contact 142 to complete an electric circuit for energizing a light 144. The closure of the contacts 141 and 142 is produced by the outward movement of the button 138 when the piston 120 is shifted in either direction from the centered position in which it is illustrated in FIG. 4. The light 144 is positioned on the dashboard (not shown) of the vehicle so that it may be observed by the driver as an indication that either the front or the rear brake systems have failed. The spring 140 serves to hold the piston 120 in its centered position and prevent the light 144 from being turned on as a result of inconsequential differences in the brake pressure. It will be seen that wufficient clearance is provided in a chamber 146 to permit the screw head 132 to move to the right relative to the valve spool 122. By this means the piston 120 may move to the right as an indication of the failure of the rear brake system. Under such circumstances, the valve spool 122 remains stationary. Upon failure of the front brakes, however, the movement of the piston 120 to the left will cause the head 132 of the screw 130 to contact the right-hand end of the valve spool 122 and move the valve spool 122 to the left. This movement will effect closure of the seal 148 to block communication between the opening 108 and the opening 116. It will also cause closure of a seal 150 to block communication between the openings 110 and 118. At the same time a seal 152 is opened to place the inlet opening 108 in direct communication with the opening 118 through the chamber 146, the slots 134, and the space surrounding the right-hand end of the valve spool 122. This will isolate the proportioning valve 42 and pressure relieving valve 44 from rear brake pressure and cause direct transmission of rear brake pressure from the master cylinder 10 to the rear wheel brake cylinders 46.

What I claim is:

1. A brake system including a dual master cylinder having means for separately pressurizing two fluid systems, front and rear brakes, a pressure modulating device connected to said rear brakes, a bypass valve arranged to receive fluid pressure from said master cylinder and having a first path for the transmission of fluid pressure from said master cylinder to said pressure modulating device and a second path for the direct transmission of fluid pressure from said master cylinder to said rear brakes without going through said modulating device, said bypass valve having a pressure responsive member exposed to the pressure of the fluid in said two fluid brake systems on opposite sides thereof and valve means associated with said pressure responsive member, said valve means normally maintaining said first path open and said second path closed, said valve means being operable to close said first path and open said second path in response to a movement of said pressure responsive member occasioned by a loss of pressure in the front brake system.

2. The structure set forth in claim 1, wherein said pressure responsive member constitutes a piston portion of a valve spool.

3. The structure set forth in claim 1, wherein said pressure responsive member comprises a piston and wherein said valve means includes a valve spool having a lost motion relation with said piston.

4. The structure set forth in claim 1 including signal means actuated upon a predetermined movement of said pressure responsive member.

5. The structure set forth in claim 1 including a spring operable to oppose movement of said pressure responsive member in a direction which causes said valve means to move from its normal position.

6. A brake system including a dual master cylinder having means for separately pressuring front and rear brake systems, front and rear brake cylinders, a pressure modulating device, and a bypass valve including a housing having first and second inlet openings, first and second outlet openings, a bore connected to said inlet and outlet openings, and a valve spool in said bore carrying first and second seals, said first seal normally closing said first inlet opening from said second outlet opening and said second seal being normally open but being operable to close said first outlet opening from said first inlet opening upon a predetermined movement of said valve spool, said first inlet opening being arranged to receive fluid pressure from said master cylinder, said first outlet opening being arranged to transmit fluid pressure to said fluid pressure modulating device, said second inlet opening being arranged to receive fluid pressure from said pressure modulating device and said second outlet being arranged to deliver fluid pressure to said rear brake cylinders, and pressure responsive means exposed to front wheel brake pressure and rear wheel brake pressure on the opposite sides thereof and being operable to produce movement of said valve spool upon failure of front brake pressure to open said first seal and close said second seal.

7. The structure set forth in claim 6 including a third normally open seal carried by said valve spool, said third seal being operable to block communication between said first inlet opening and said second inlet opening upon movement of said valve spool.

8. The structure set forth in claim 7 including passage means provided in said valve spool normally providing communication between said first inlet opening and said first outlet opening.

9. In a dual hydraulic brake system having a separate hydraulic pressure for each system and having a proportioning valve for one of the systems with the proportioning valve being operable generally for reducing the pressure to that one system under preselected conditions, a device for bypassing the proportioning valve, said device comprising means including a bypass passage for bypassing the proportioning valve and means responsive to the separate hydraulic pressure providing fluid flow to said one system through said bypass passage in response to failure of the other system.

10. A fluid pressure system comprising a pair of friction devices,
dual fluid pressure generating means for applying separate fluid pressures to said friction devices to effect energization thereof, respectively,
means for reducing the magnitude of one of the fluid pressures applied to one of said friction devices to a value predeterminately less than that of the other of the fluid pressures applied to the other of said friction devices, and
other means for by-passing said last named means upon the failure of the other fluid pressure applied to said other friction device.

11. A fluid pressure system comprising a pair of friction devices,
dual fluid pressure generating means for applying separate fluid pressures to said friction devices to effect energization thereof, respectively,
means for altering the magnitude of the magnitude of the fluid pressure applied to one of said friction devices, and
other means responsive to failure of the fluid pressure applied to the other of said friction devices for by-passing the applied fluid pressure directly to said one friction device and around said last named means to obviate the altering effect thereof in the magnitude of the fluid pressure applied to said one friction device.

12. A fluid pressure system comprising a pair of system branches,
dual fluid pressure generating means for normally establishing fluid pressures having substantially equal magnitudes in said branches,
a friction device in one of said branches energized in response to the established fluid pressure therein, another friction device in the other of said branches, means in said other branch for altering the magnitude of the established fluid pressure applied to said other friction device to effect energization thereof, and other means responsive to failure of the established fluid pressure in said one branch to by-pass the established fluid pressure in said other branch to said other friction device and obviate the altering effect of said last named means on the magnitude of the established fluid pressure applied to said other friction device.

13. A fluid pressure system comprising a pair of system branches, means including a pair of fluid pressure generating means for normally establishing fluid pressures having substantially equal magnitudes in said branches, a friction device in one of said branches energized in response to the established fluid pressure therein, another friction device in the other of said branches, means in said other branch for normally altering the magnitude of the established fluid pressure delivered to said other friction device to effect energization thereof, and other means connected between said branches and also defining a connection in said other branch between the fluid pressure generating means thereof and said other friction device in by-pass relation with said last named means, said other means being responsive to failure of the fluid pressure established by said fluid pressure generating means in said branch, to by-pass the established fluid pressure in said other branch to said other friction device.

14. A fluid pressure system comprising a pair of system branches, dual fluid pressure generating means including a pair of fluid pressure generating chambers therein respectively connected with said branches, and means movable in each of said chambers for normally establishing fluid pressures in said branches having substantially equal magnitudes, a friction device connected in one of said branches with one of said chambers for energization in response to the established fluid pressure therein, another friction device connected in the other of said branches with the other of said chambers, valve means connected in said other branch between said other chamber and friction device and responsive to the established fluid pressure for altering the magnitude thereof delivered to said other friction device to effect energization thereof, and other means including a first chamber connected in said one branch with said one chamber, and a second chamber connected in said other branch between said other chamber and valve means, means movable in said other means between said first and second chambers, opposed areas on said movable means respectively responsive to the established fluid pressures in said first and second chambers, respectively, and said movable means defining with said other means normally closed by-pass passage means for connection with said second chamber and with said other branch between said valve means and other friction device, said movable means being movable in one direction in response to established fluid pressure in said second chamber acting on one opposed end thereof and having a magnitude predeterminately greater than that of the established fluid pressure in said other branch acting on the other opposed end thereof toward a position opening said by-pass passage means and delivering established fluid pressure therethrough to said other friction device in by-pass relation with said valve means to obviate the altering effect thereof in the magnitude of established fluid pressure delivered to said other friction device.

15. A fluid pressure system comprising, a pair of fluid pressure branches, means for establishing fluid pressure in said branches, means responsive to the established fluid pressure in one of said branches to effect the application therethrough of an altered fluid pressure, and means for comparing the established fluid pressures in said branches including means for by-passing said second named means to obviate the application of the altered fluid pressure in said one branch when the established fluid pressure in said one branch exceeds that in the other of said branches by a predetermined value.

16. A fluid pressure system comprising, a pair of fluid pressure branches having a pair of fluid pressure responsive motors therein, respectively, means for establishing fluid pressure in said branches for actuating said motors, means connected in one of said branches with said first named means and responsive to the established fluid pressure in said one branch to alter the magnitude thereof and effect the application of an altered fluid pressure to the motor in said one branch, and other means connected in said one branch between said first and second named means and in the other of said branches between the motor therein and said first named means including means for comparing the magnitudes of the established fluid pressures in said branches and movable toward opposed actuated positions in response to a differential in excess of a predetermined value between the magnitudes of the established fluid pressures in said branches, and said included means defining by-pass means in said one branch between the motor therein and said first named means for by-passing said second named means and obviating the altering effect thereof on the established fluid pressure in said one branch upon movement of said included means to one of its actuated positions when the magnitude of the established fluid pressure exceeds that of the established fluid pressure in the other branch by the predetermined value.

17. In a dual brake system having a separate hydraulic supply for each system and each system including at least one fluid operated brake, means for performing a fluid modulating operation on the existing fluid pressure in one of the systems and thereby varying the pressure to the brake of that one system under preselected braking conditions, and means responsive to a preselected pressure condition in the other of said systems for communicating fluid to the brake of said one system without subjecting said fluid to the normal fluid modulating operation of said modulating means.

18. In a dual brake system having a separate hydraulic supply for each system and each system including at least one fluid operated brake, means for performing a fluid modulating operation on the existing fluid pressure in one of the systems and thereby varying the pressure to the brake of that one system under preselected braking conditions, and means responsive to a failure of the other system to render said modulating means incapable of performing said modulating operation so that fluid is communicated to the brake of the one system without being subjected to the normal fluid modulating operation of said modulating means.

19. In a dual brake system having a separate hydraulic supply and at least one fluid operated brake for the front wheels and the rear wheels of a vehicle, means for performing a fluid modulating operation on the existing fluid pressure of the brake system associated with the rear wheels of the vehicle and thereby varying the pressure to the brake of that one system under preselected braking conditions, and means responsive to a preselected change in the operational characteristics of the brake system associated with the front wheels of the vehicle for communicating fluid to said brake system associated with the rear wheels of the vehicle without subjecting said fluid to the normal fluid modulating operation of said modulating means.

20. In a dual brake system having a separate hydraulic supply for each system and each system including at least one fluid operated brake, means for performing a fluid modulating operation on the existing fluid pressure in one of the systems and thereby varying the pressure to the brake of that one system under preselected braking conditions, and means responsive to a preselected pressure condition in the other of said systems including a by-pass passage for providing fluid flow to the brake of said one system without having said fluid subjected to the normal fluid modulating operation of said modulating means.

21. In a dual brake system having a separate hydraulic supply for each system and each system including at least one fluid operated brake, means for performing a fluid modulating operation on the existing fluid pressure in one of the systems and thereby varying the pressure to the brake of that one system under preselected braking conditions, and means operable in response to a failure in the other system for communicating fluid to the brake of said one system without subjecting said fluid to the normal fluid modulating operation of said modulating means.

22. The invention as set forth in claim 21 wherein said means for performing said modulating operation comprises a proportioning valve, and wherein said last mentioned means is operable in response to a failure in the other system to render said proportioning valve incapable of performing its normal fluid proportioning operation.

23. A vehicle hydraulic split brake system comprising a dual master cylinder having separate pressurizing chambers respectively generating pressures in a first brake pressurizing circuit for energizing a first group of vehicle wheel brake actuators and in a second brake pressurizing circuit for energizing a second group of vehicle wheel brake actuators, a pressure regulator in said first circuit for reducing brake pressure delivered to said first group of vehicle wheel brake actuators from said master cylinder, and a brake pressure control sensing brake pressure in said first circuit fluidly intermediate said master cylinder and said regulator and sensing brake pressure in said second circuit and including a pressure regulator bypass piston having a first position connecting said first circuit to said first group of vehicle wheel brake actuators through said regulator, said brake pressure control being responsive to a predetermined sensed brake pressure differential between said sensed brake pressures caused by a pressure loss in said second circuit to place said bypass piston in a second position to bypass said pressure regulator and directly fluid connect said first vehicle wheel brake actuators and said dual master cylinder to deliver full brake pressure through said first circuit without pressure reduction.

24. The vehicle hydraulic split brake system of claim 23 said brake pressure control having a housing provided with a bore, said bypass piston being reciprocably movable in said bore in response to said sensed pressurized differential, said bypass piston having an annular space connected to said pressure regulator and to said first group of vehicle wheel brake actuators when said bypass piston is in said first position, said annular space being disconnected from said pressure regulator, and said first group of vehicle wheel brake actuators being fluid connected through a working chamber defined by one end of said bypass piston and said housing to said first brake pressurizing circuit intermediate said master cylinder and said regulator when said bypass piston is in said second position.

25. In a dual hydraulic system having first and second separately pressurizable lines normally subjected to substantially equal pressures and a pressure changing device in one of said lines operable to modulate the fluid pressure in one of said lines, the improvement comprising, a housing, a member movable in said housing responsive to said predetermined pressure differential between the pressures in said lines and having a neutral position when said pressures are balanced, said member being movable within said housing in response to a predetermined pressure differential in said lines for causing fluid to be transmitted through said one line without being subjected to said modulating operation of said pressure changing device.

26. A device as set forth in claim 25 wherein said member is axially movable within said housing.

27. A device as set forth in claim 25 wherein said pressure changing device comprises a proportioning valve and wherein said member is axially movable within said housing to cause fluid to be transmitted to said one line without being subjected to the normal fluid proportioning operation of said proportioning valve.

28. A device for use in dual brake systems including a housing
an axial bore in said housing, piston means slidably mounted in said axial bore and making sealing engagement with the walls thereof,
passage means at a first axial location in said bore to admit fluid pressure therein from a first brake line,
a chamber at a second axial location in said bore to admit fluid pressure from a second brake line, whereby said piston means is normally held in a neutral position by a balanced fluid pressure at said passage means and said chamber,
a pressure changing valve operable to modulate fluid to one of said brake lines,
said piston means when in said neutral position permitting normal modulating operation of said pressure changing valve and when in a shifted position causing fluid to be transmitted to said one brake line without being subjected to the fluid modulating operation of said pressure changing valve.

29. A hydraulic brake device for use in dual brake systems including a housing,
an axial bore in said housing,
piston means slidably mounted in said axial bore and making sealing engagement with the walls thereof,
passage means at one end of said axial bore to admit fluid pressure therein from a first brake line,
a chamber at the other end of said axial bore at the other end of said piston means whereby said piston means is normally in a neutral position by a balanced fluid pressure at said passage means and said chamber,
a proportioning valve connected to one of said brake lines,
means connecting said proportioning valve with said housing and said one brake line,
said piston means when in said neutral position operable to permit normal proportioning operation of said valve,
said piston being movable to a position other than said neutral position to cause fluid to be transmitted to said one brake line without being subjected to the normal proportioning operation of said valve.

30. In a dual hydraulic system having first and second lines normally subject to substantially equal pressures and including
a pressure changing device for performing a fluid modulating operation of fluid transmitted through one of said lines, the improvement comprising,
a housing,
a member axially movable in said housing and responsive to said predetermined pressure differential and having a neutral position when said pressures are balanced,
said member including fluid flow control means operable in response to movement of said member for rendering said pressure changing valve incapable of performing a fluid modulating operation on fluid transmitted through said one line.

31. In a dual hydraulic brake system having front and rear brake cylinders and a master cylinder for separately pressurizing said front and rear brake cylinders, that improvement which comprises a pressure modulating valve having a passage through which pressure is transmitted from the master cylinder to the rear brake cylinders, modulating means in said valve shiftable to open and close said passage to perform a modulating operation on the fluid transmitted to the rear brake cylinders, piston means including a first portion having the rear brake cylinder pressure acting thereon to move said piston means axially within said valve, and a second portion having the front brake cylinder pressure acting thereon to move said piston means axially within said valve, said piston means being operable to render said modulating means incapable of performing a modulating operation upon a predetermined pressure reduction in the front brake cylinders.

32. A dual brake system for a motor vehicle including front and rear brake cylinders, a dual master cylinder having means for separately pressurizing said front and rear brake cylinders, first and second conduit means connecting said master cylinder to said front and rear brake cylinders respectively, modulating valve means in said second conduit means being operable to perform a fluid pressure modulating operation on the fluid transmitted to said rear brake cylinders under predetermined conditions, and means for preventing said fluid modulating operation to occur upon a failure of pressure in said first conduit means.

33. In a dual hydraulic brake system having front and rear brake cylinders and a dual master cylinder for separately pressurizing said front and rear brake cylinders, the improvement comprising a fluid pressure modulating valve having means defining a passage through which fluid pressure is transmitted from the master cylinder to the rear brake cylinder, modulating means in said valve adapted to perform a fluid modulating operation on fluid transmitted through said passage, means including a first portion having the rear brake cylinder pressure acting thereon and a second portion having the front brake cylinder pressure acting thereon, said last mentioned means being actuatable to render said modulating means inoperable to perform said modulating operation under preselected differential pressure conditions between said front and rear brake cylinders.

34. In a dual hydraulic brake system having front and rear brake cylinders and a dual master cylinder for separately pressurizing said front and rear brake cylinders, the improvement comprising a fluid pressure modulating valve having means defining a passage through which fluid pressure is transmitted from the master cylinder to the rear brake cylinder, a valve element for modulating fluid pressure supplied to said rear brake cylinder, a shiftable piston including a first portion having the rear brake cylinder pressure exposed thereto and a second portion having the front brake cylinder pressure exposed thereto, said piston being shiftable upon a preselected decrease in fluid pressure at said front brake cylinder to cause fluid to be supplied to said rear brake cylinder without such fluid being acted upon by said modulating valve.

35. A dual brake system for a motor vehicle including front and rear brake cylinders, a master cylinder having means for separately pressurizing said front and rear brake cylinders, means defining a flow path connecting said master cylinder to said front and rear brake cylinders respectively, modulating valve means communicable with one of said flow paths and adapted to modulate the fluid pressure transmitted to said rear brake cylinders relative to master cylinder pressure under predetermined conditions, and means for transmitting unmodulated fluid pressure to said rear brake cylinders upon a predetermined fluid pressure decrease at said front brake cylinder.

* * * * *